(12) United States Patent
Albero et al.

(10) Patent No.: US 12,293,232 B2
(45) Date of Patent: May 6, 2025

(54) TRACKING OF DIGITAL RESOURCES ACROSS MULTIPLE VIRTUAL REALITY COMPUTING ENVIRONMENTS

(71) Applicant: BANK OF AMERICA CORPORATION, Charlotte, NC (US)

(72) Inventors: George Anthony Albero, Charlotte, NC (US); Olga Kocharyan, Matthews, NC (US); Elizabeth Rhodes Kral, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 234 days.

(21) Appl. No.: 18/141,831

(22) Filed: May 1, 2023

(65) Prior Publication Data

US 2024/0370304 A1 Nov. 7, 2024

(51) Int. Cl.
| | |
|---|---|
| G06F 15/16 | (2006.01) |
| G06F 9/50 | (2006.01) |
| G06F 9/54 | (2006.01) |
| H04L 9/40 | (2022.01) |
| H04L 29/06 | (2006.01) |

(52) U.S. Cl.
CPC ........ *G06F 9/5055* (2013.01); *H04L 63/1416* (2013.01)

(58) Field of Classification Search
CPC ............................ G06F 9/5055; H04L 63/1416
USPC ........................................................ 726/23
See application file for complete search history.

(56) References Cited

U.S. PATENT DOCUMENTS

| | | | | |
|---|---|---|---|---|
| 11,017,611 | B1* | 5/2021 | Mount | G06V 20/20 |
| 11,126,320 | B1* | 9/2021 | Thompson | G06F 3/0482 |
| 11,204,678 | B1* | 12/2021 | Baker | G06F 3/04842 |
| 11,328,349 | B1* | 5/2022 | Gay | G06Q 40/00 |
| 2014/0168056 | A1* | 6/2014 | Swaminathan | G06V 30/142 345/156 |
| 2017/0132842 | A1* | 5/2017 | Morrison | G06F 3/04815 |
| 2017/0193749 | A1* | 7/2017 | Levi | A63F 13/61 |
| 2019/0205647 | A1* | 7/2019 | Kumar | G06Q 10/06316 |
| 2019/0272588 | A1* | 9/2019 | Ye | G06Q 30/0226 |
| 2021/0041950 | A1* | 2/2021 | von und zu Liechtenstein | G06F 3/013 |
| 2021/0044925 | A1* | 2/2021 | Millius | H04W 4/80 |
| 2021/0380143 | A1* | 12/2021 | Alvarez | B60W 40/08 |
| 2024/0160704 | A1* | 5/2024 | Albero | G06F 21/16 |
| 2024/0221323 | A1* | 7/2024 | Mukherjee | G06V 10/761 |
| 2024/0364673 | A1* | 10/2024 | Albero | H04L 67/131 |

\* cited by examiner

Primary Examiner — Hamza N Algibhah
(74) Attorney, Agent, or Firm — Moore & Van Allen PLLC; Anup Iyer

(57) ABSTRACT

Tracking digital resources used in resource exchange events conducted in virtual reality computing environments. Digital resources used in resource exchange events conducted in virtual reality computing environments are tagged with data that at least identifies the location of the resource exchange event in terms of virtual reality computing environment and/or sub-environments. In response, machine-learning algorithm(s) are implemented that analyze the tags to determine resource exchange event movement patterns for specific digital resources. The resource exchange event movement patterns may include digital resource movement across multiple different virtual computing environments.

20 Claims, 12 Drawing Sheets

TRACKING OF DIGITAL RESOURCES ACROSS MULTIPLE VIRTUAL REALITY COMPUTING ENVIRONMENTS

FIELD OF THE INVENTION

The present invention is related generally to computing network security and, more specifically, systems and methods for authenticating entities and virtual objects representing entities in augmented and/or virtual reality computing environments, such as, the Metaverse.

BACKGROUND

The use of augmented and/or virtual reality computing environments (collectively referred to herein as "virtual reality computing environments) have become increasing more prevalent. By way of example, the Metaverse is a hypothetical iteration of the Internet as a single, universal and immersive virtual reality computing environment that is facilitated by the use of virtual reality and augmented reality headsets. Thus, the Metaverse provides the ability for a user to associate with an avatar (i.e., a virtual representation/object of the user) and for the avatar to conduct resource exchange events within a virtual environment. While the resource exchange event is initiated entirely within the virtual environment, it results in an actual exchange of resources between the user and the resource-providing entity. In this regard, a user presents digital resources in exchange for physical goods and/or services. However, resource exchange events conducted in virtual computing environments can readily be associated with wrongful activities.

Therefore, a need exists to develop systems, methods, computer program products and the like which seek to detect and/or protect against wrongful activities associated with resource exchange events conducted in virtual computing environments.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by tracking digital resources used in resource exchange events conducted in virtual reality computing environments. In this regard, digital resources used in resource exchange events conducted in virtual reality computing environments are tagged with data that at least identifies the location of the resource exchange event in terms of virtual reality computing environment and/or sub-environments. In response, machine-learning algorithm(s) are implemented that analyze the tags to determine resource exchange event movement patterns for specific digital resources.

In specific embodiments of the invention, the resource exchange event movement patterns may include movement of digital resources across multiple different virtual computing environments (e.g., a first resource exchange event using specified digital resources conducted within one virtual computing environment and a second resource exchange event using at least a portion of the same specified digital resources conducted within a different virtual computing environment). In other specific embodiments of the invention, the resource exchange event movement patterns may include movement of digital resources into or out of a non-virtual computing environment (e.g., the Internet or the like) and/or (iii) prior to the tagging of the digital resources (i.e., prior to using the digital resources in the virtual computing environment).

In further specific embodiments of the invention, machine-learning algorithm(s) are used to determine parties (users, groups of users or the like) that are connected to the resource exchange event movement patterns and/or identify suspicious activity based on the resource exchange event movement patterns. In response to identifying suspicious activity, signals (e.g., notifications or the like) can be generated and communicated that are configured to prevent at least one of (i) users associated with a resource exchange event movement pattern from conducting a subsequent resource exchange event, and (ii) specified digital resources identified in resource exchange event movement pattern being used to conduct a subsequent resource exchange event.

As a means for facilitating embodiments of the present invention, distributed trust computing networks (e.g., block chain networks or the like) that store the digital resources and data associated with the digital resource events including the aforementioned tags may be configured such that a network of entities represented by the sub-environments are provided access to the tags for purpose of machine-learning analysis. In this regard, the invention provides for embodiments in which the entities have access to tags/data for resource exchange events to which the entity was not a party to.

A system for tracking digital resources across multiple virtual reality computing environments defines first embodiments of the invention. The system includes a first computing platform including a first memory and one or more first computing processor devices in communication with the first memory. The first memory stores a virtual reality application that is executable by at least one of the one or more first computing processor devices. The virtual reality application is configured to present, to users, a virtual reality computing environment that includes sub-environments, each of the sub-environments representing a corresponding entity. The system additionally includes a second computing platform including a second memory and one or more second computing processor devices in communication with the second memory. The second memory stores a resource exchange event application that is executable by at least one of the one or more third computing processor devices. The resource exchange event application is configured to process resource exchange events. Each resource exchange event conducted (i) within one of the sub-environments, and (ii) between one of the users and the corresponding entity. Processing of the resource exchange events includes receiving digital resources from the user and tagging the digital resources with a tag that at least identifies the location of the resource exchange event in terms of virtual reality computing environment and/or sub-environments.

The system additionally includes a third computing platform including a third memory and one or more third computing processor devices in communication with the third memory. The third memory stores one or more machine-learning based algorithms that are executable by at least one of the one or more third computing devices. The machine-learning algorithm(s) are configured to receive and analyze the tags to determine one or more resource exchange event movement patterns for digital resources.

In specific embodiments of the system, the one or more machine-learning based algorithms are further configured to analyze the tags to determine the one or more resource exchange event movement patterns for the digital resources, such that, the one or more resource exchange event movement patterns include a resource exchange event movement pattern that provides for movement of digital resources (i) across two or more virtual reality computing environments and/or (ii) into or out of a non-virtual computing environment (e.g., the Internet or the like) and/or (iii) prior to the tagging of the digital resources.

In other specific embodiments of the system, the one or more machine-learning based algorithms are further configured to analyze the tags to determine the one or more resource exchange event movement patterns for the digital resources, such that, the one or more resource exchange movement patterns include resource exchange event movement patterns that are specific to at least one of (i) one of the users, (ii) a group of the users, and (iii) an entity represented by a sub-environment.

In still further specific embodiments of the system, the one or more machine-learning based algorithms are further configured to identify users or groups of users connected to the one or more resource exchange event movement patterns.

In further specific embodiments of the system, the one or more machine-learning based algorithms are further configured to identify suspicious activity based on the one or more resource exchange event movement patterns and, in response to identifying suspicious activity, generate and communicate signals to the resource exchange event application that are configured to prevent at least one of (i) one of the users from conducting a subsequent resource exchange event, and (ii) specified digital resources being used to conduct a subsequent resource exchange event.

Moreover, in further embodiments the system includes a plurality of distributed trust computing networks, each distributed trust computing network (i) associated with one or more of the entities represented by the sub-environments and (ii) comprising a plurality of decentralized nodes, each decentralized node having a fourth memory and one or more fourth computing processor devices in communication with the fourth memory. The fourth memory of the decentralized nodes is configured to store at least one distributed ledger comprising a plurality of data blocks that store resource exchange event data including the tags. In related embodiments of the system, a plurality of the entities represented by the sub-environments form a network and have access to the plurality distributed trust computing networks for purposes of accessing the tags and analyzing the tags with the one or more machine-learning based algorithms.

A computer-implemented method for tracking digital resources within multiple virtual reality computing environments defines second embodiments of the invention. The method being executable by one or more computing device processors. The computer-implemented method includes presenting, to users, a virtual reality computing environment from amongst two or more virtual reality computing environments. The virtual reality computing environment includes sub-environments, each of the sub-environments representing a corresponding entity. The computer-implemented method further includes processing resource exchange events, each resource exchange event conducted (i) within one of the sub-environments and (ii) between one of the users and the corresponding entity. Processing of the resource exchange events includes receiving digital resources from the user and tagging the digital resources with a tag that at least identifies the location of the resource exchange event in terms of virtual reality computing environment and/or sub-environments. In addition, the computer-implemented method includes implementing one or more machine-learning algorithms to analyze the tags to determine one or more resource exchange event movement patterns for digital resources.

In specific embodiments of the computer-implemented method, implementing further includes implementing the one or more machine-learning algorithms to analyze the tags to determine the one or more resource exchange event movement patterns for digital resources, such that, the one or more resource exchange event movement patterns include a resource exchange event movement pattern that provides for movement of digital resources (i) across two or more virtual reality computing environments, and/or (ii) into or out of a non-virtual computing environment and/or (iii) prior to the tagging of the digital resources.

In other specific embodiments of the computer-implemented method, implementing further includes implementing the one or more machine-learning algorithms to analyze the tags to determine the one or more resource exchange event movement patterns for digital resources, such that, the one or more resource exchange event movement patterns include resource exchange event movement patterns that are specific to at least one of (i) one of the users, (ii) a group of the users, and (iii) an entity represented by a sub-environment.

In still further specific embodiments of the computer-implemented method, implementing further includes implementing one or more machine-learning algorithms to identify users or groups of users connected to the one or more resource exchange event movement patterns.

Moreover, in additional specific embodiments of the computer-implemented method, implementing further includes implementing machine-learning algorithms to identify suspicious activity based on the one or more resource exchange event movement patterns, and in response to identifying suspicious activity, generating and communicating signals that are configured to prevent at least one of (i) one of the users from conducting a subsequent resource exchange event, and (ii) specified digital resources being used to conduct a subsequent resource exchange event.

A computer program product including a non-transitory computer-readable medium defines third embodiments of the invention. The non-transitory computer-readable medium includes sets of codes for causing one or more computing devices to present, to users, a virtual reality computing environment from amongst a plurality of virtual reality computing environments. The virtual reality computing environment includes sub-environments, each of the sub-environments representing a corresponding entity. The sets of codes further cause the one or more computing devices to process resource exchange events. Each resource exchange event conducted (i) within one of the sub-environments and (ii) between one of the users and the corresponding entity. Processing the resource exchange events includes receiving digital resources from the user and tagging the digital resources with a tag that at least identifies the location of the resource exchange event in terms of virtual reality computing environment and/or sub-environments. Moreover, the sets of codes further cause the one or more computing devices to implement machine-learning techniques to analyze the tags to determine one or more resource exchange event movement patterns for digital resources.

In specific embodiments of the computer program product, the set of codes for causing the one or more computing devices to implement machine-learning are further configured to cause the one or more computing devices to implement machine-learning techniques to analyze the tags to determine the one or more resource exchange event movement patterns for digital resources, such that the one or more resource exchange event movement patterns include a resource exchange event movement pattern that provides for movement of digital resources (i) across two or more virtual reality computing environments, and/or (ii) into or out of a non-virtual computing environment and/or (iii) prior to the tagging of the digital resources.

In still further embodiments of the computer program product, the sets of codes further include sets of codes for causing the one or more computing devices to implement machine-learning to identify suspicious activity based on the one or more resource exchange event movement patterns, and, in response to identifying suspicious activity, generate and communicate signals that are configured to prevent at least one of (i) one of the users from conducting a subsequent resource exchange event, and (ii) specified digital resources being used to conduct a subsequent resource exchange event.

Thus, according to embodiments of the invention, which will be discussed in greater detail below, the present invention provides for tracking digital resources used in resource exchange events conducted in virtual reality computing environments. Digital resources used in resource exchange events conducted in virtual reality computing environments are tagged with data that at least identifies the location of the resource exchange event in terms of virtual reality computing environment and/or sub-environments. In response, machine-learning algorithm(s) are implemented that analyze the tags to determine resource exchange event movement patterns for specific digital resources. The resource exchange event movement patterns may include digital resource movement across multiple different virtual computing environments. Resource exchange event movement patterns may be used to identify connected parties and/or suspicious activities, such that, subsequent resource exchange events involving the same users, connected parties and digital resources can be prevented or heightened security measures can be implemented to authorize such resource exchange events.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
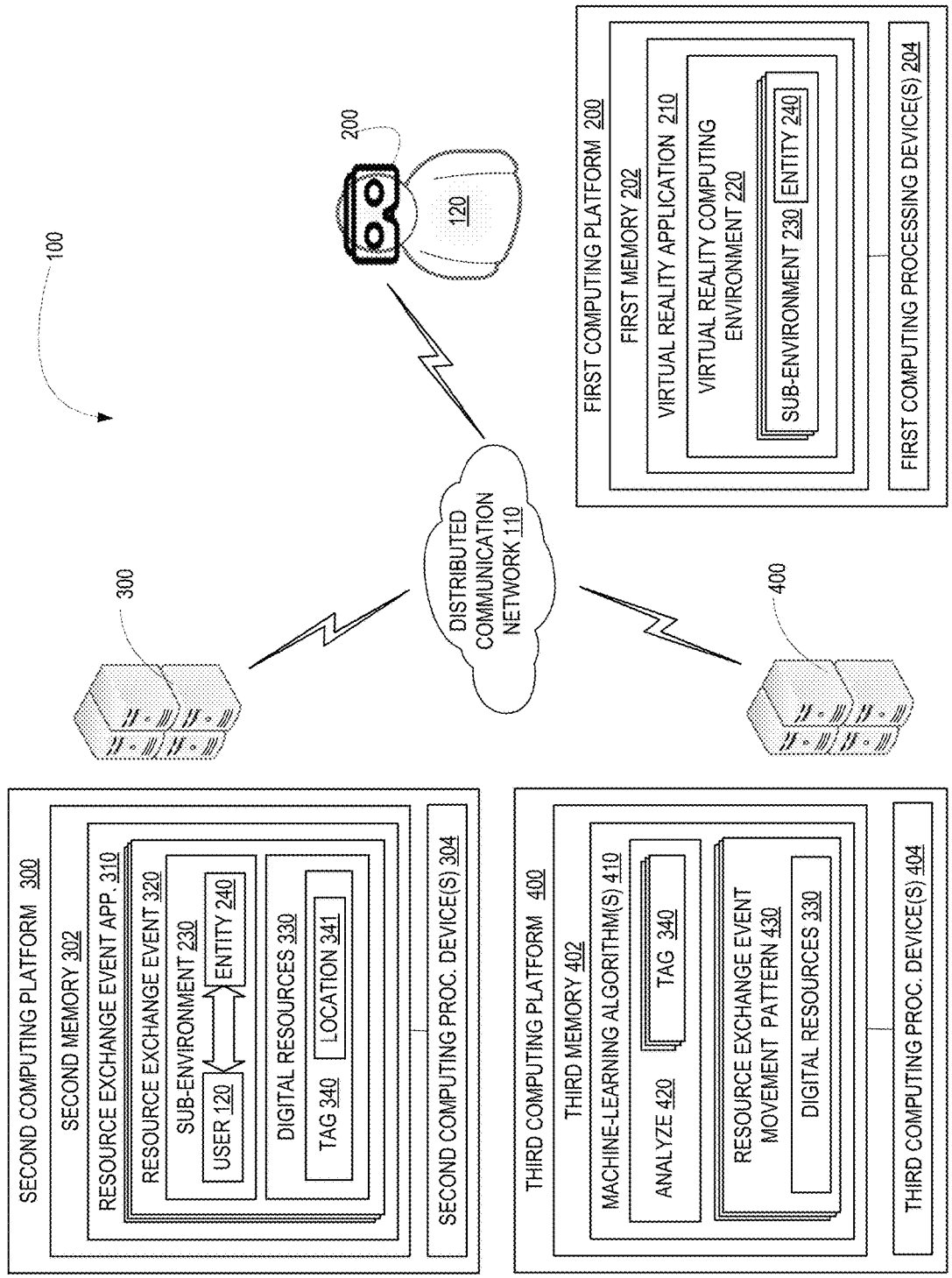
Figure 9:
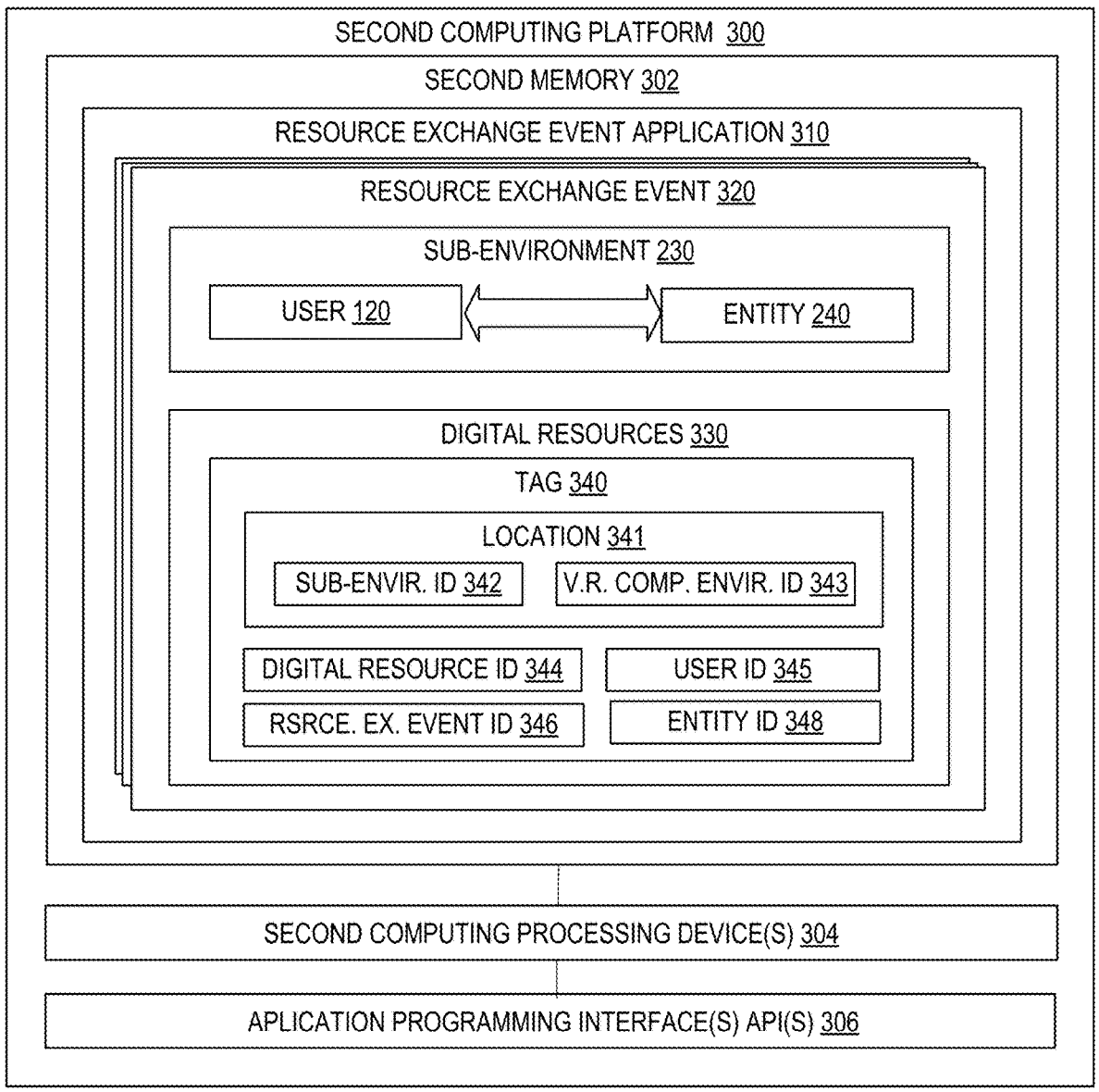
Figure 10:
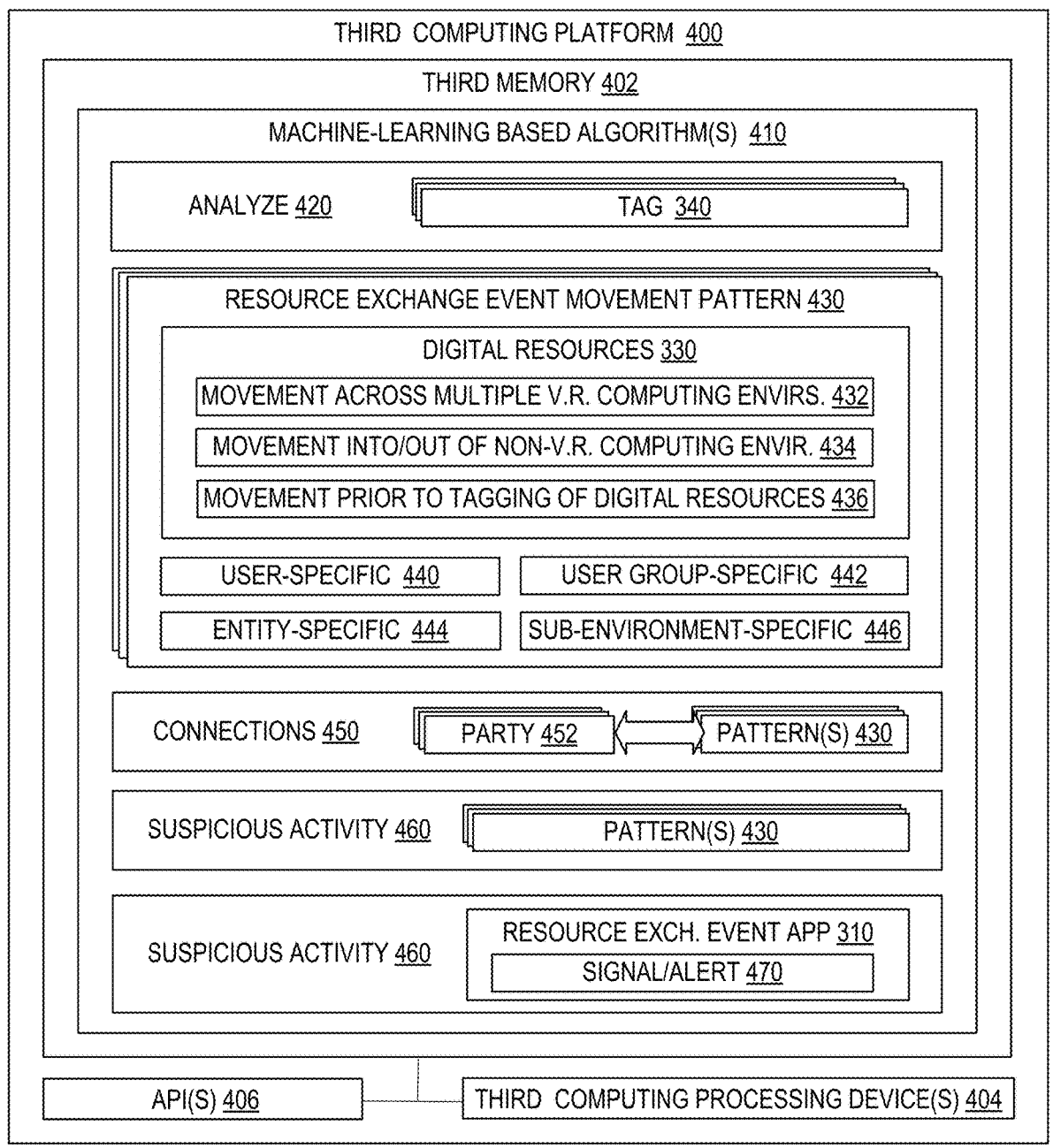
Figure 11:
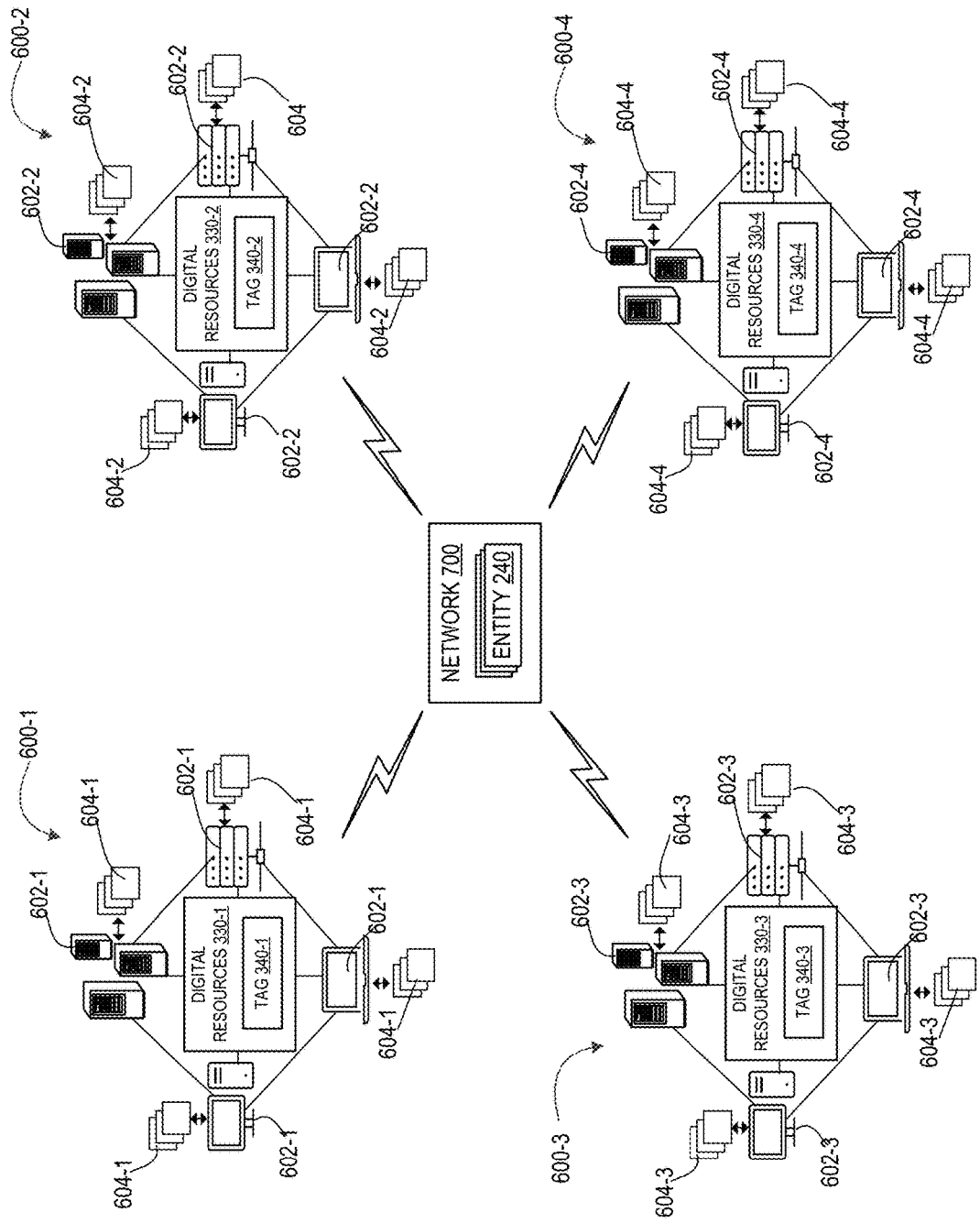
Figure 12:
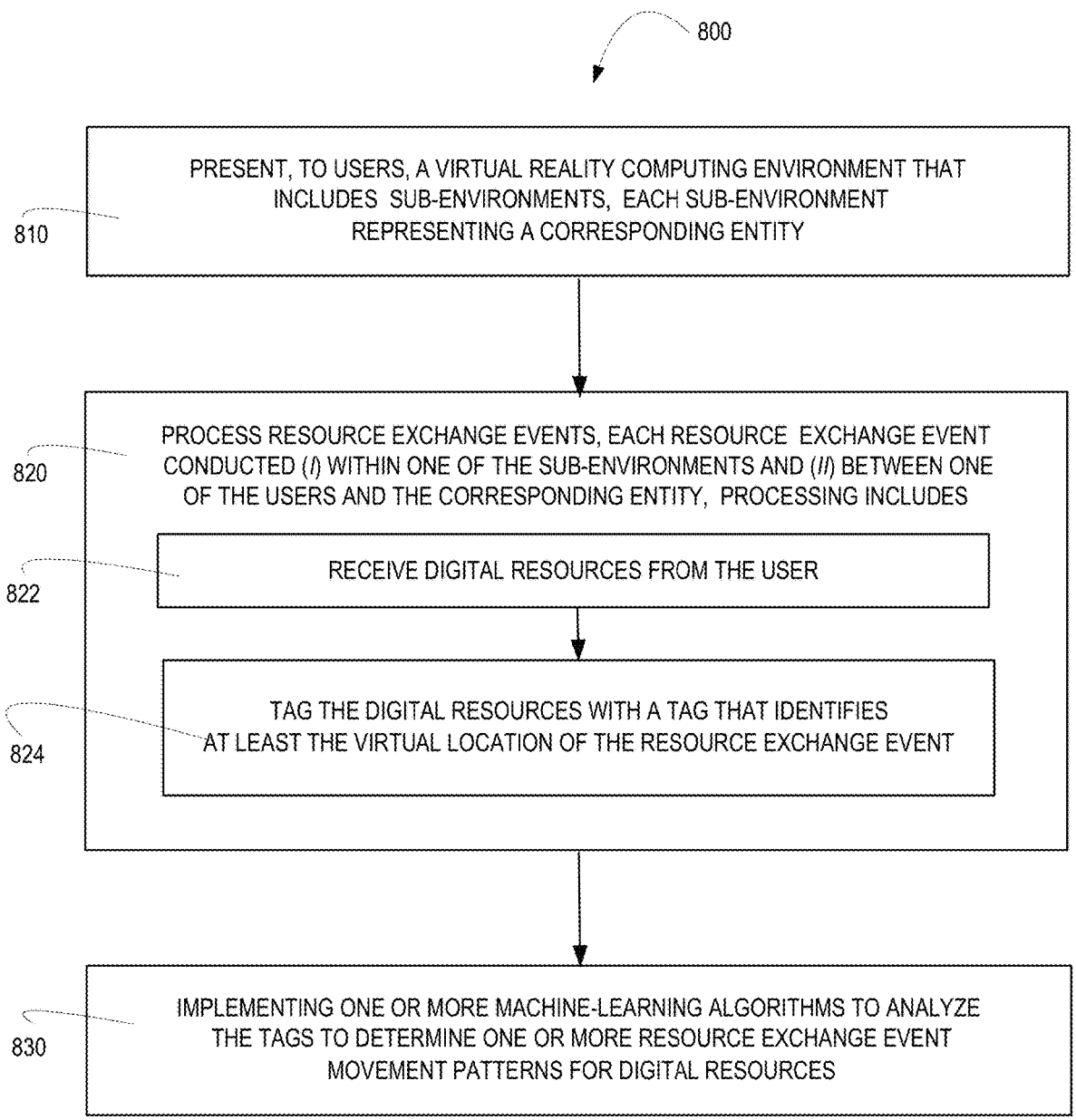

Having thus described embodiments of the disclosure in general terms, reference will now be made to the accompanying drawings, wherein:

FIG. 1 is a schematic/block diagram of system for tracking digital resources used in resource exchange events conducted in virtual reality computing environments, in accordance with embodiments of the present invention;

FIGS. 2-8 are schematic/block diagrams of examples of resource exchange event movement patterns associated with the same digital resources, in accordance with embodiments of the present invention;

FIG. 9 is a block diagram of a computing platform including a resource exchange event application configured to process resource exchange events including tagging digital resources, in accordance with embodiments of the present invention; and FIG. 10 is a block diagram of a computing platform including machine-learning-based algorithm(s) configured to analyze tags and determine resource exchange event movement patterns defined by having the same digital resources, in accordance with embodiments of the invention;

FIG. 11 is a schematic diagram of multiple different distributed trust computing networks storing distributed ledgers that data blocks comprising digital resources and corresponding tags and a network of entities configured for accessing the multiple different distributed trust computing network, in accordance with embodiments of the present invention; and FIG. 12 is a flow diagram of a method for tracking digital resources used in resource exchange events conducted in virtual reality computing environments, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

As used herein, "virtual reality computing environment", which includes augmented reality computing environments, may refer to a collection of persistent, shared, three-dimensional virtual spaces linked into a perceived virtual universe. One example of multiple virtual computing environments is the Metaverse, which is a hypothetical iteration of the Internet as a single, universal and immersive virtual reality computing environment that is facilitated by the use of virtual reality and augmented reality headsets. In some embodiments, a virtual reality computing environment may not only refer to virtual worlds, but the Internet as a whole, including the spectrum of augmented reality. A virtual reality computing environment may include a number of different elements such as video conferencing, digital currencies, virtual reality platforms, social media, live data streaming, digital representations of real-life objects and/or the like. In some embodiments, a virtual reality computing environment may include virtual properties, such as virtual land parcels and estates for users to create and build-on, or structures that reflect real-life properties and/or completely original creations. These spaces may be represented by co-ordinates on the metaverse platform where users can meet up using their avatars (i.e., virtual objects) to socialize and decorate their own spaces with collectibles. Any combination of the aforementioned elements may form a computer-mediated virtual environment, i.e., a virtual world, within the metaverse. Within this self-sustaining, persistent, and shared realm, users may exist and interact with each other using their digital avatars (i.e., virtual objects).

Further, as used herein, a "sub-environment" within a virtual reality computing environment refers to a specific zone, region, sub-verse or location within the overall environment, which has virtual boundaries. The "sub-environment" represents a corresponding entity, which is characteristically a non-human entity, such as an organization, a business, e.g., a resource-providing entity or the like suitable for conducting resource exchange events (e.g., transactions) with users. For example, the entity may be a financial institution, a retailer or the like.

Thus, according to embodiments of the invention, which will be described in more detail below, systems, methods and computer program products are disclosed that provide for tracking digital resources used in resource exchange events conducted in virtual reality computing environments. In this regard, digital resources (e.g., digital currency, such as cryptocurrency or the like) used in resource exchange events (e.g., transactions for goods and/or services or the like) conducted in virtual reality computing environments are tagged with data that at least identifies the location of the resource exchange event in terms of virtual reality computing environment and/or sub-environments. In response, machine-learning algorithm(s) are implemented that analyze the tags to determine resource exchange event movement patterns for specific digital resources.

In specific embodiments of the invention, the resource exchange event movement patterns may include movement of digital resources across multiple different virtual computing environments (e.g., a first resource exchange event using specified digital resources conducted within one virtual computing environment and a second resource exchange event using at least a portion of the same specified digital resources conducted within a different virtual computing environment). In other specific embodiments of the invention, the resource exchange event movement patterns may include movement of digital resources into or out of a non-virtual computing environment (e.g., the Internet or the like) and/or (iii) prior to the tagging of the digital resources (i.e., prior to using the digital resources in the virtual computing environment).

In further specific embodiments of the invention, machine-learning algorithm(s) are used to determine parties (users, groups of users or the like) that are connected to the resource exchange event movement patterns and/or identify suspicious activity based on the resource exchange event movement patterns. In response to identifying suspicious activity, signals (e.g., notifications or the like) can be generated and communicated that are configured to prevent at least one of (i) users associated with a resource exchange event movement pattern from conducting a subsequent resource exchange event, and (ii) specified digital resources identified in resource exchange event movement pattern being used to conduct a subsequent resource exchange event.

As a means for facilitating embodiments of the present invention, distributed trust computing networks (e.g., block chain networks or the like) that store the digital resources and data associated with the digital resource events including the aforementioned tags may be configured such that a network of entities represented by the sub-environments are provided access to the tags for purpose of machine-learning analysis. In this regard, the invention provides for embodiments in which the entities have access to tags/data for resource exchange events to which the entity was not a party to.

Referring to FIG. 1, a schematic/block diagram is presented of a system 100 for tracking digital resources used in resource exchange events conducted in virtual reality computing environments, in accordance with embodiments of the invention. The system 100 is implemented within a distributed communication network 110, which may include the Internet, one or more intranets, one or more cellular networks or the like. The system 100 includes a first computing platform 200 which may comprise a user-based component(s) associated with a virtual reality computing environment user 120, such as virtual reality headset 200 or the like. In other embodiments of the invention some or all of the functionality of applications executed on first computing platform 200 may be network-based, such that, computing platform 200 may comprise servers or the like. First computing platform 200 includes first memory 202 and one or more first computing processing devices 204 in communication with first memory 202. First memory 202 stores virtual reality application 210, which is executable by at least one of the one or more first computing processor devices 204. As previous discussed for purposes of the present invention the phrase "virtual reality" includes augmented reality and any other two dimensional or three-dimensional simulated human-like experience.

Virtual reality application 200 is configured to present to users including user 120 via a user device, such as virtual reality headset 200, a virtual reality computing environment 220 that includes a plurality of sub-environment(s) 230 representing a corresponding entity 240 that is non-human. For example, the entity 240 may be an organization, a business or the like. As previously discussed, a sub-environment 230 is a region, zone, location or sub-verse with the overall virtual reality computing environment 220 having virtual boundaries.

System 100 additionally includes second computing platform 300, which may comprise servers or the like, which is in network communication with first computing platform 200 via distributed communication network 110. Second computing platform 300 includes second memory 302 and one or more second computing processing devices 304 in communication with second memory 302. Second memory 302 stores resource exchange event application 310, which is executable by at least one of the one or more second computing processor devices 304. Resource exchange event application 310 is configured to process resource exchange events 320 that are conducted within a sub-environment 230 of the virtual reality computing environment 220 between the user 120 and a corresponding entity 240 (i.e., the entity 240 represented by the sub-environment 230). Processing the resource exchange event 320 includes receiving digital resources 330 from the user 120 and tagging the digital resources 330 with a tag 340 that identifies, at least, a location 341 of the resource exchange event. The location 341 of the resource exchange event 330 may be defined by the virtual reality computing environment 220 in which the event takes place, as well as, in some embodiments, the sub-environment 230 (i.e., virtual boundaries) in which the event takes place.

System 100 additionally includes third computing platform 400, which may comprise servers or the like, which is in network communication with first computing platform 200 and second computing platform 300 via distributed communication network 110. Third computing platform 400 includes third memory 402 and one or more third computing processing devices 404 in communication with third memory 402. Third memory 402 stores one or more machine-learning based algorithms 410 that are executable by one or more of the third computing processor device(s) 404. Machine-learning-based algorithms 410 are configured to receive and analyze 420 the tags 340 to determine one or more resource exchange event movement patterns 430 for digital resources 330. In this regard, resource exchange event movement patterns 430 define patterns of movement for specific digital resources 330, which may subsequently be useful in determining and/or predicting suspicious and/or malicious activities.

Figure 2:
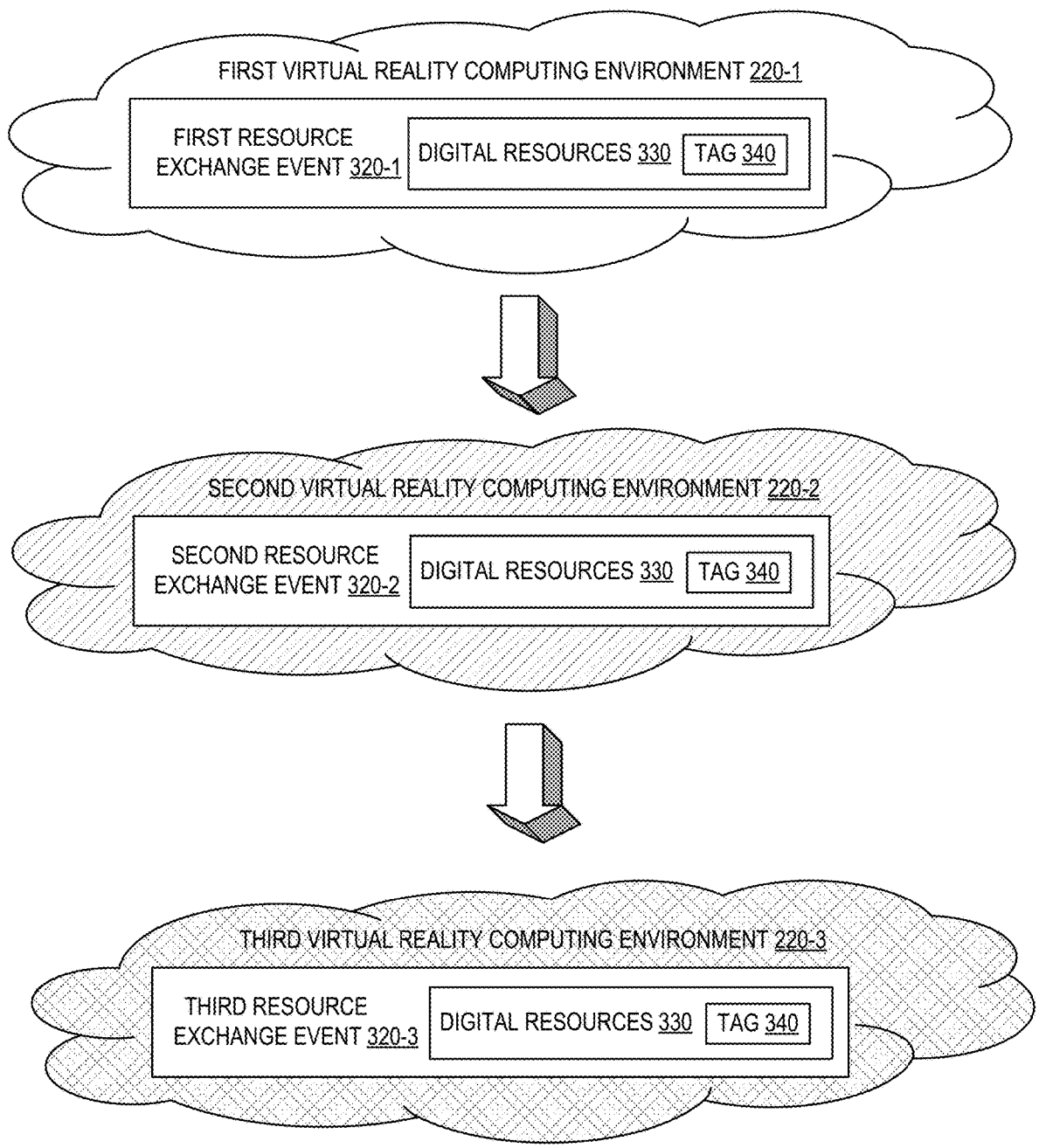

Referring to a FIGS. 2-8, schematic/block diagrams are presented of exemplary resource exchange event movement patterns 430, in accordance with embodiments of the present invention. FIG. 2 highlights a resource exchange event movement pattern example in which the resource exchange events that comprise the pattern occur within different virtual reality computing environments, in accordance with embodiments of the present invention. Different virtual reality computing environments may include, but are not limited to, segments of a single Metaverse or more than one Metaverse or the like. As shown in FIG. 2 a first resource exchange event 320-1 occurs within a first virtual reality computing environment 220-1 using digital resources 330 that are tagged with tag 340 which identifies, at a minimum, the location 341 (shown in FIG. 1) of the first resource exchange event 320-1. Second resource exchange event 320-2 occurs within a second virtual reality computing environment 220-2 (different than the first virtual reality computing environment 220-1) using the same digital resources 330. Processing of second resource exchange event 320-2 includes tagging the digital resources 330 with tag 340 (i.e., additional information added to the existing tag or generating a new tag) which identifies, at a minimum, the location 341 (shown in FIG. 1) of the second resource exchange event 320-2. Third resource exchange event 320-3 occurs within a third virtual reality computing environment 220-3 (different than the first and second virtual reality computing environments 220-1, 220-2) using the same digital resources 330. Processing of third resource exchange event 320-3 includes tagging the digital resources 330 with tag 340 (i.e., additional information added to the existing tag or generating a new tag) which identifies, at a minimum, the location 341 (shown in FIG. 1) of the third resource exchange event 320-3. The resource exchange event movement pattern 430 is identified by the machine-learning algorithms 410 when additional digital resources 330 undergo the same movement pattern (i.e., a first resource exchange event within first virtual reality computing environment, a second resource exchange event within second virtual reality computing environment, a third resource exchange event within third virtual reality computing environment and so on). Additionally, the pattern 420 may have other pattern-defining criteria besides the same movement pattern. While three different virtual computing environments and three resource exchange events are shown, one of ordinary skill in the art will be appreciate that a pattern 430 may comprise more or less different virtual reality computing environments and more or less resource exchange events.

Figure 3:
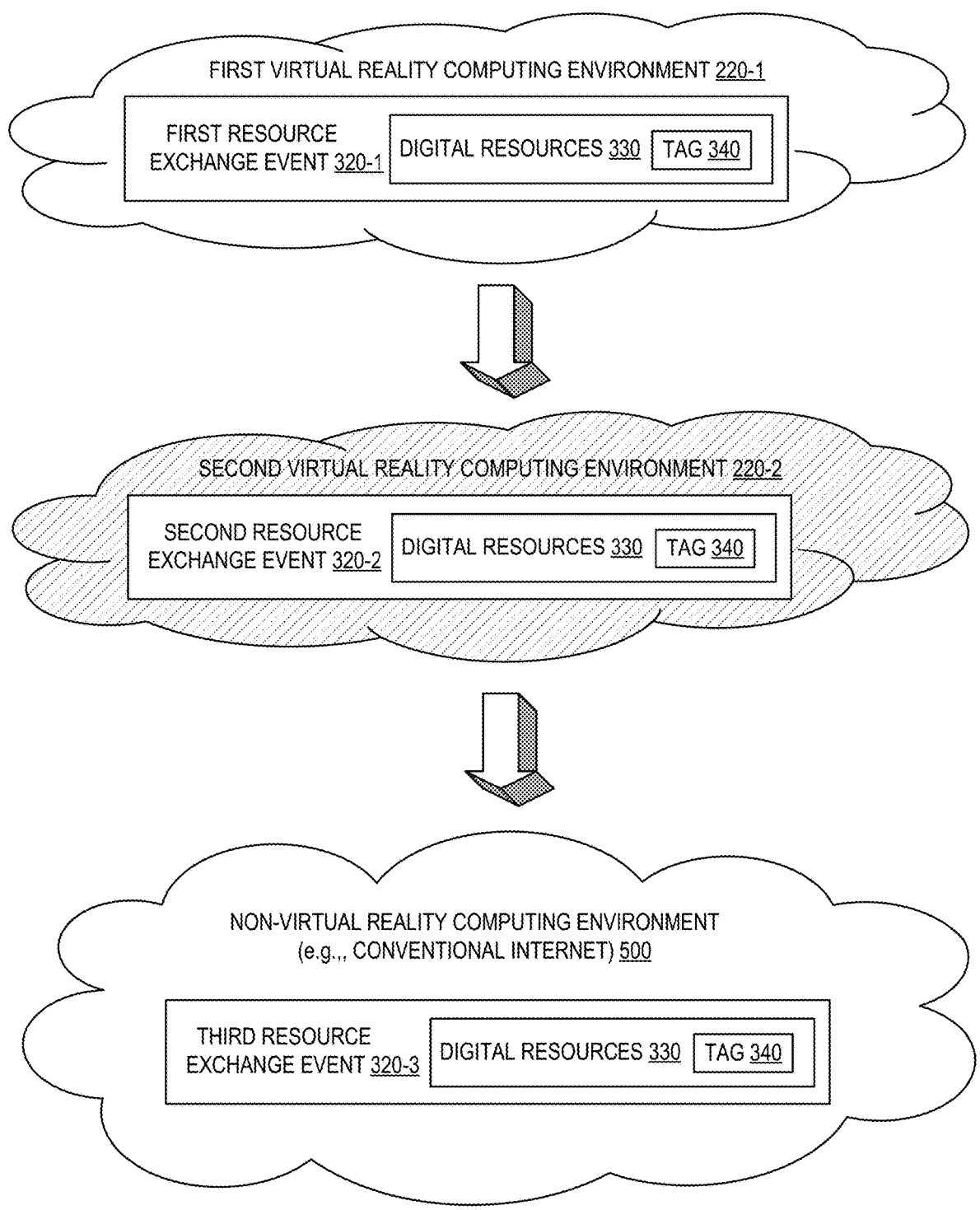

Referring to FIG. 3, a resource exchange event movement pattern example is highlighted in which a resource exchange event that comprise the pattern occur outside of virtual reality computing environments (i.e., occur in a non-virtual reality computing environment, such as conventional Internet environment or the like), in accordance with embodiments of the present invention. As shown in FIG. 3 a first resource exchange event 320-1 occurs within a first virtual reality computing environment 220-1 using digital resources 330 that are tagged with tag 340 which identifies, at a minimum, the location 341 (shown in FIG. 1) of the first resource exchange event 320-1. Second resource exchange event 320-2 occurs within a second virtual reality computing environment 220-2 (different than the first virtual reality computing environment 220-1) using the same digital resources 330. Processing of second resource exchange event 320-2 includes tagging the digital resources 330 with tag 340 (i.e., additional information added to the existing tag or generating a new tag) which identifies, at a minimum, the location 341 (shown in FIG. 1) of the second resource exchange event 320-2. Third resource exchange event 320-3 occurs within a non-virtual reality computing environment 500 (e.g., conventional Internet environment or the like) using the same digital resources 330. Processing of third resource exchange event 320-3 includes tagging the digital resources 330 with tag 340 (i.e., additional information added to the existing tag or generating a new tag) which identifies, at a minimum, the location 341 (shown in FIG. 1) of the third resource exchange event 320-3. The resource exchange event movement pattern 430 is identified by the machine-learning algorithms 410 when additional digital resources 330 undergo the same movement pattern (i.e., a first resource exchange event within first virtual reality computing environment, a second resource exchange event within second virtual reality computing environment, a third resource exchange event within a non-virtual reality computing environment and so on). Additionally, the pattern 420 may have other pattern-defining criteria besides the same movement pattern. While two different virtual computing environments and a single non-virtual computing environment and three resource exchange events are shown, one of ordinary skill in the art will be appreciate that a pattern 430 may comprise more or less different virtual and non-virtual reality computing environments and more or less resource exchange events.

Figure 4:
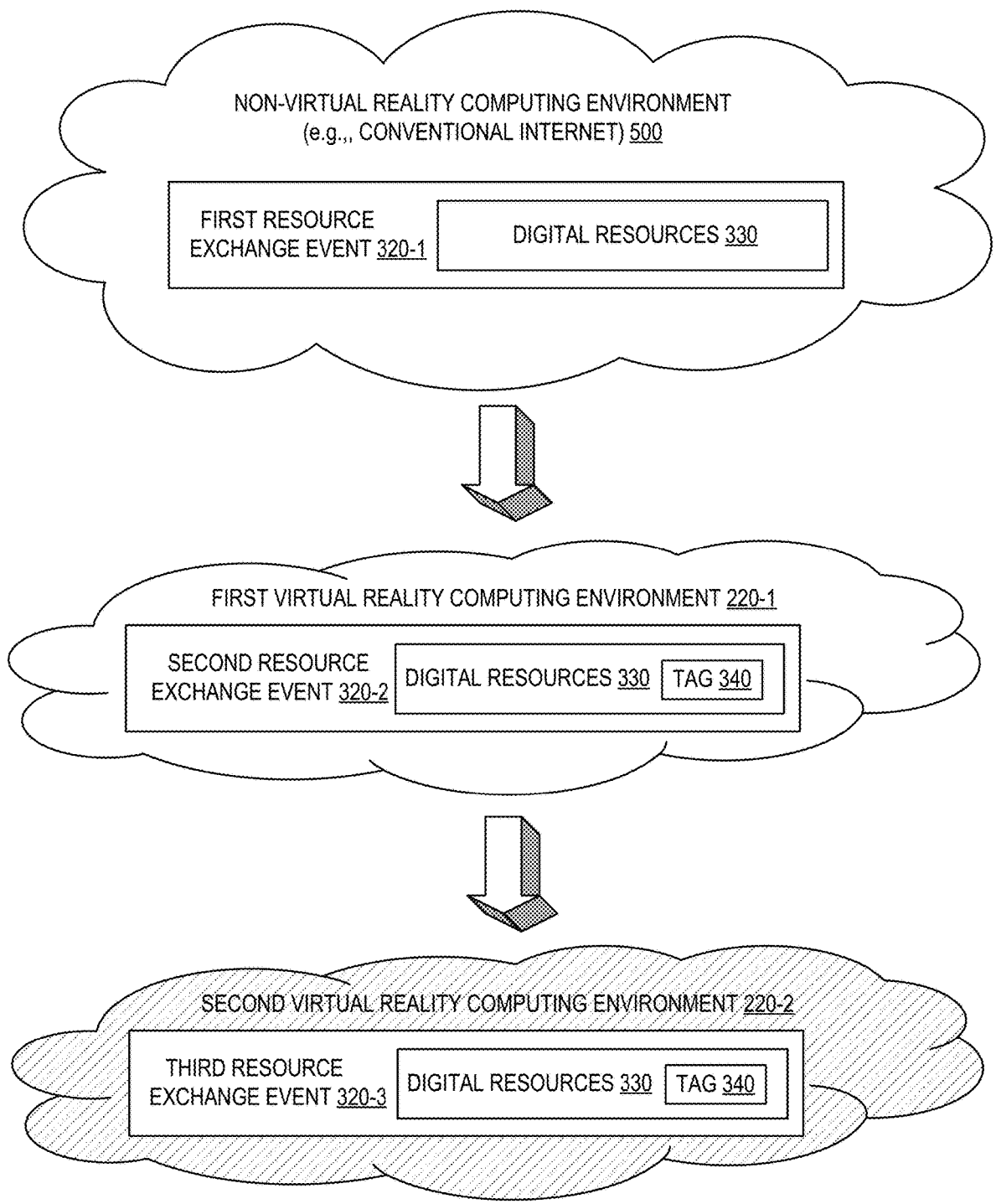

Referring to FIG. 4, a resource exchange event movement pattern example is highlighted in which a resource exchange event that occurs prior to the tagging of the digital resources is included in the pattern, in accordance with embodiments of the present invention. As shown in FIG. 4 a first resource exchange event 320-1 occurs within a non-virtual reality computing environment 500 using digital resources 330, which at this point are not yet tagged. Second resource exchange event 320-2 occurs within a first virtual reality computing environment 220-1 using the same digital resources 330. Processing of first resource exchange event 320-2 includes tagging the digital resources 330 with tag 340 which identifies, at a minimum, the location 341 (shown in FIG. 1) of the second resource exchange event 320-2. Third resource exchange event 320-3 occurs within a second virtual reality computing environment 200-2 using the same digital resources 330. Processing of third resource exchange event 320-3 includes tagging the digital resources 330 with tag 340 (i.e., additional information added to the existing tag or generating a new tag) which identifies, at a minimum, the location 341 (shown in FIG. 1) of the third resource exchange event 320-3. The resource exchange event movement pattern 430 is identified by the machine-learning algorithms 410 when additional digital resources 330 undergo the same movement pattern (i.e., a first resource exchange event within non-virtual reality computing environment, a second resource exchange event within first virtual reality computing environment, a third resource exchange event within second reality computing environment and so on). Pattern use of resource exchange events that occur prior to the tagging of the digital resources is made possible by the fact that digital resources, by themselves, are identifiable. Additionally, the pattern 420 may have other pattern-defining criteria besides the same movement pattern. While two different virtual computing environments and a single non-virtual computing environment and three resource exchange events are shown, one of ordinary skill in the art will be appreciate that a pattern 430 may comprise more or less different virtual and non-virtual reality computing environments and more or less resource exchange events.

Figure 5:
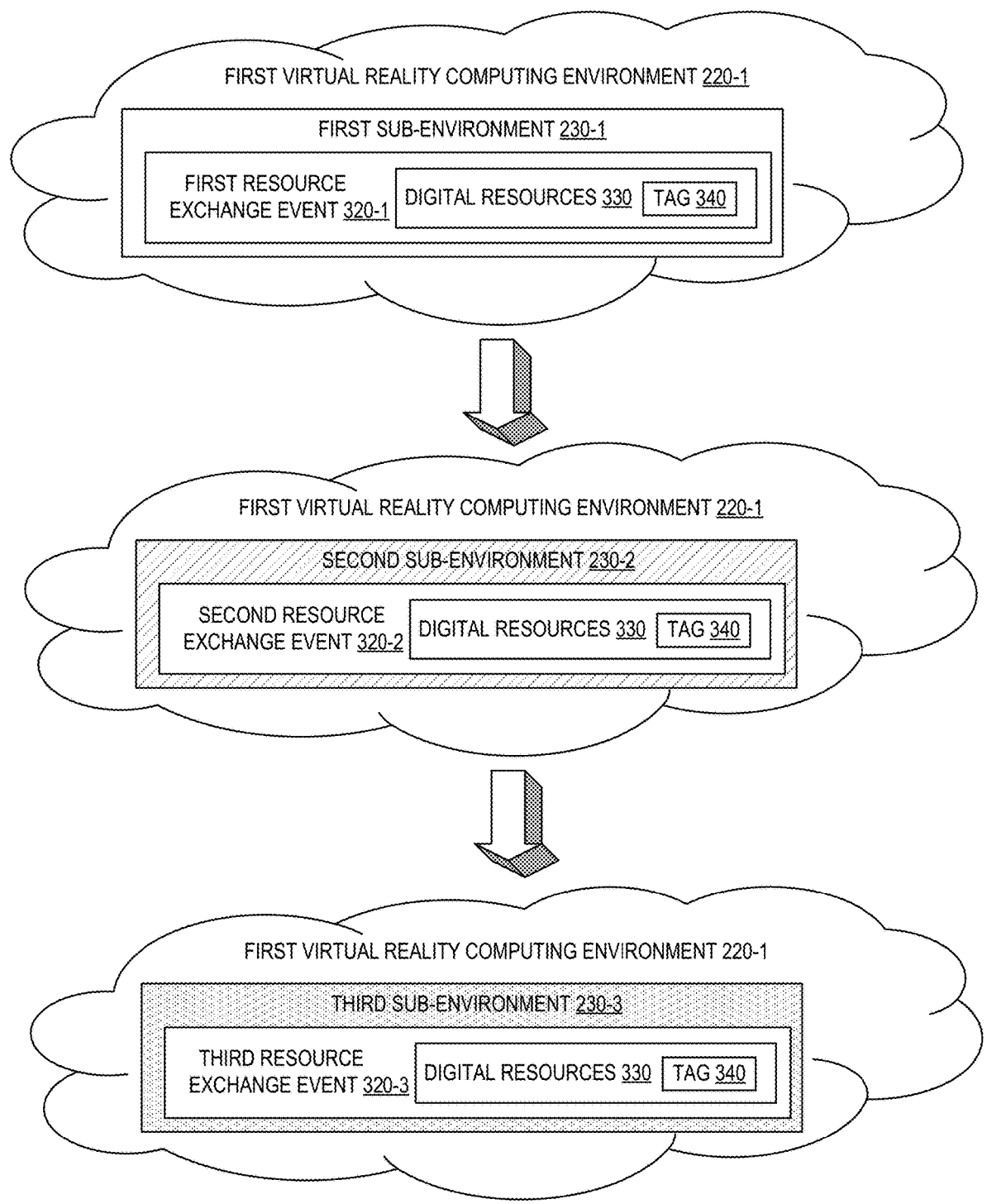

FIG. 5 highlights a resource exchange event movement pattern example in which the resource exchange events that comprise the pattern occur within different sub-environments of the same virtual reality computing environment, in accordance with embodiments of the present invention. As shown in FIG. 5 a first resource exchange event 320-1 occurs within a first sub-environment 230-1 of first virtual reality computing environment 220-1 using digital resources 330 that are tagged with tag 340 which identifies, at a minimum, the location 341 (shown in FIG. 1) of the first resource exchange event 320-1. Second resource exchange event 320-2 occurs within a second sub-environment 230-2 (different than the first sub-environment 230-1) of first virtual reality computing environment 220-1 using the same digital resources 330. Processing of second resource exchange event 320-2 includes tagging the digital resources 330 with tag 340 (i.e., additional information added to the existing tag or generating a new tag) which identifies, at a minimum, the location 341 (shown in FIG. 1) of the second resource exchange event 320-2. Third resource exchange event 320-3 occurs within a third sub-environment 230-3 (different than the first and second sub-environments 230-1, 230-2) of first virtual reality computing environment 220-1 using the same digital resources 330. Processing of third resource exchange event 320-3 includes tagging the digital resources 330 with tag 340 (i.e., additional information added to the existing tag or generating a new tag) which identifies, at a minimum, the location 341 (shown in FIG. 1) of the third resource exchange event 320-3. The resource exchange event movement pattern 430 is identified by the machine-learning algorithms 410 when additional digital resources 330 undergo the same movement pattern (i.e., a first resource exchange event within first sub-environment, a second resource exchange event within second sub-environment, a third resource exchange event within third sub-environment and so on). Additionally, the pattern 420 may have other pattern-defining criteria besides the same movement pattern. While three different sub-environments and three resource exchange events are shown, one of ordinary skill in the art will be appreciate that a pattern 430 may comprise more or less different sub-environments and more or less resource exchange events.

Figure 6:
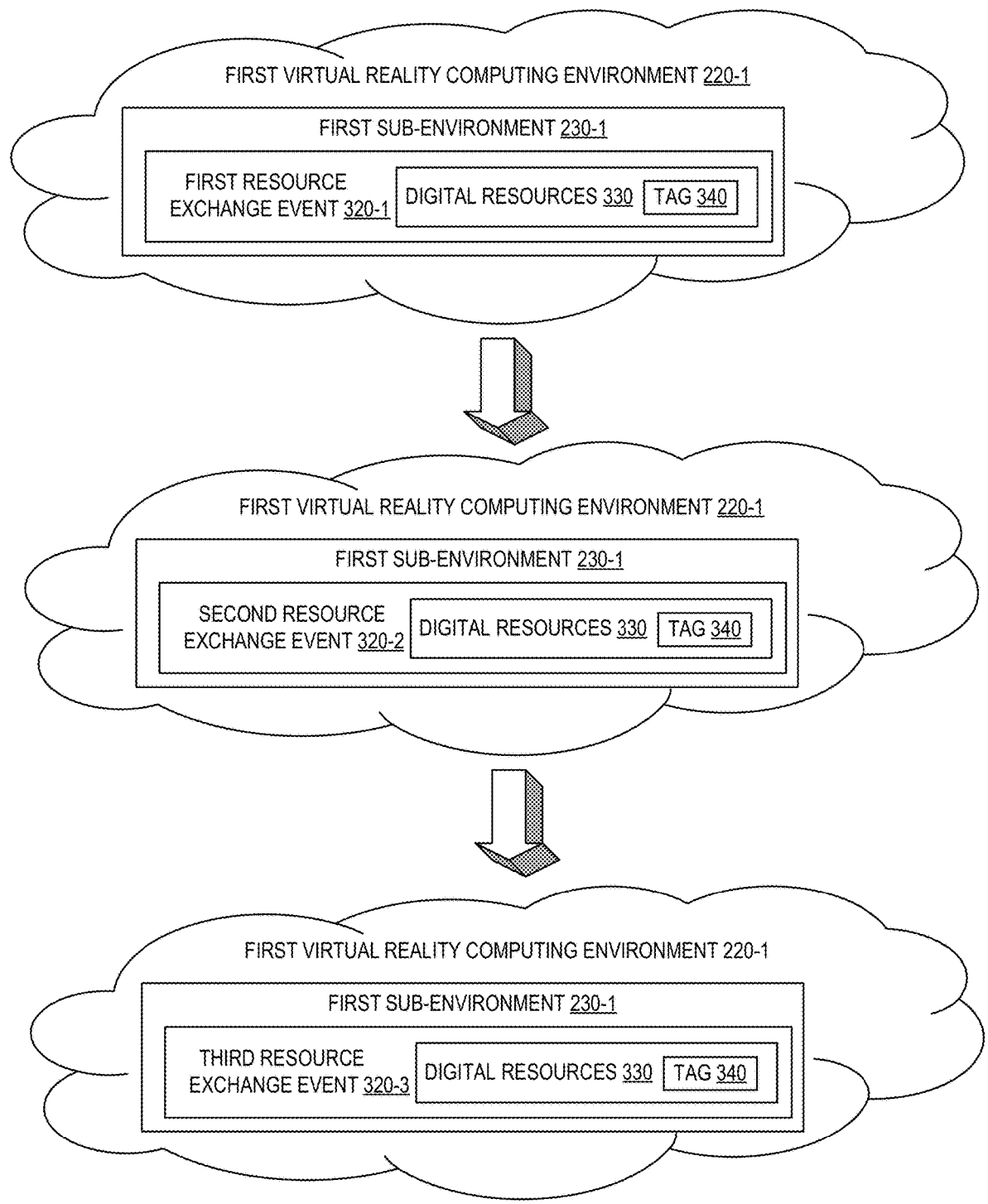

FIG. 6 highlights a resource exchange event movement pattern example in which all of the resource exchange events that comprise the pattern occur within the same sub-environments of the same virtual reality computing environment, in accordance with embodiments of the present invention. As shown in FIG. 6 a first resource exchange event 320-1 occurs within a first sub-environment 230-1 of first virtual reality computing environment 220-1 using digital resources 330 that are tagged with tag 340 which identifies, at a minimum, the location 341 (shown in FIG. 1) of the first resource exchange event 320-1. Second resource exchange event 320-2 occurs within same first sub-environment 230-1 of first virtual reality computing environment 220-1 using the same digital resources 330. Processing of second resource exchange event 320-2 includes tagging the digital resources 330 with tag 340 (i.e., additional information added to the existing tag or generating a new tag) which identifies, at a minimum, the location 341 (shown in FIG. 1) of the second resource exchange event 320-2. Third resource exchange event 320-3 occurs within the same first sub-environment 230-1 of first virtual reality computing environment 220-1 using the same digital resources 330. Processing of third resource exchange event 320-3 includes tagging the digital resources 330 with tag 340 (i.e., additional information added to the existing tag or generating a new tag) which identifies, at a minimum, the location 341 (shown in FIG. 1) of the third resource exchange event 320-3. The resource exchange event movement pattern 430 is identified by the machine-learning algorithms 410 when additional digital resources 330 undergo the same movement pattern (i.e., a first, second and third resource exchange event occurring within the same sub-environment and so on). Additionally, the pattern 420 may have other pattern-defining criteria besides the same movement pattern. While three resource exchange events are shown, one of ordinary skill in the art will be appreciate that a pattern 430 may comprise more or less resource exchange events.

Figure 7:
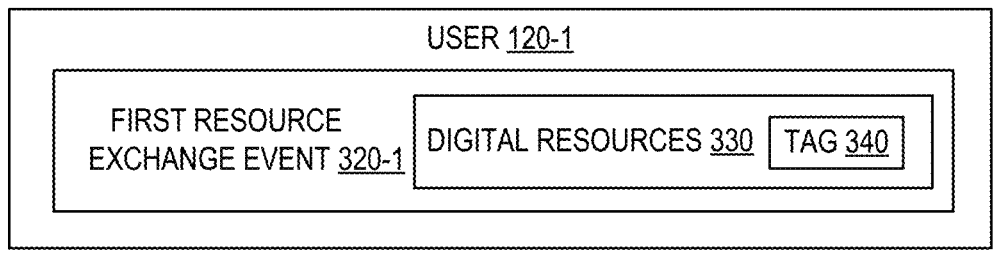
Figure 7:
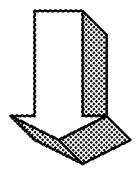
Figure 7:
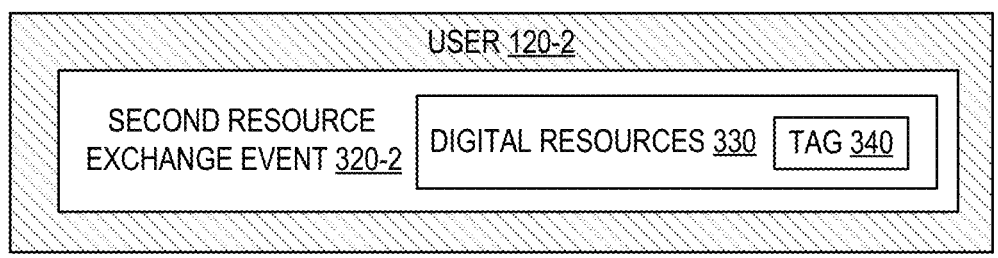
Figure 7:
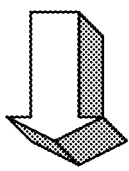
Figure 7:
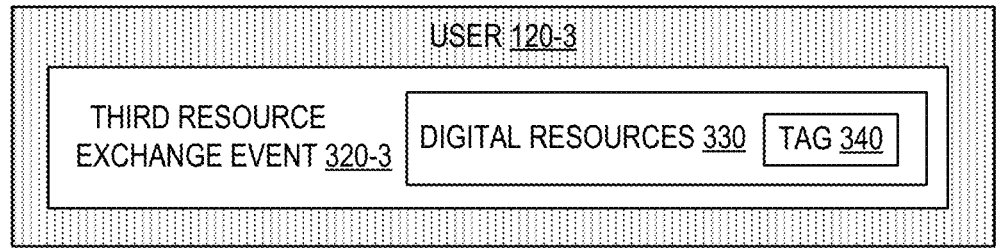

FIG. 7 highlights a resource exchange event movement pattern example in which the resource exchange events are conducted by different users, in accordance with embodiments of the present invention. Different users constitute other pattern-defining criteria besides movement. As shown in FIG. 7 a first resource exchange event 320-1 is conducted by a first user 120-1 (or group of users) using digital resources 330 that are tagged with tag 340 which identifies, at a minimum, the location 341 (shown in FIG. 1) of the first resource exchange event 320-1. Second resource exchange event 320-2 conducted by a second user 120-2 (or group of users) using the same digital resources 330. Processing of second resource exchange event 320-2 includes tagging the digital resources 330 with tag 340 (i.e., additional information added to the existing tag or generating a new tag) which identifies, at a minimum, the location 341 (shown in FIG. 1) of the second resource exchange event 320-2. Third resource exchange event 320-3 is conducted by a third user 120-3 (or group of users) using the same digital resources 330. Processing of third resource exchange event 320-3 includes tagging the digital resources 330 with tag 340 (i.e., additional information added to the existing tag or generating a new tag) which identifies, at a minimum, the location 341 (shown in FIG. 1) of the third resource exchange event 320-3. The resource exchange event movement pattern 430 is identified by the machine-learning algorithms 410 when additional digital resources 330 undergo the same movement pattern and the same different users (i.e., same three different users or group of users conducting the same sequence of resource exchange events). While three different users or groups of users and three resource exchange events are shown, one of ordinary skill in the art will be appreciate that a pattern 430 may comprise more or less users or group of users and more or less resource exchange events.

Figure 8:
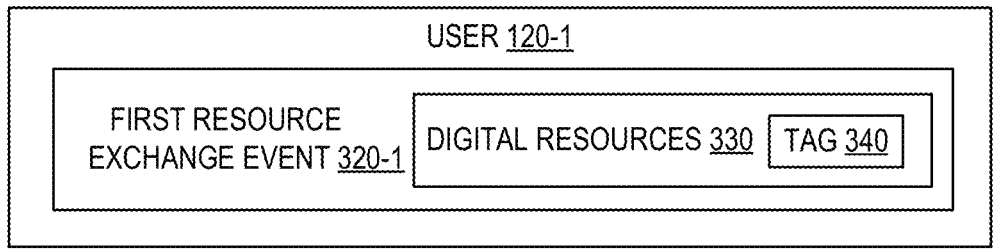
Figure 8:
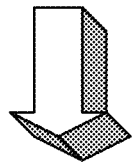
Figure 8:
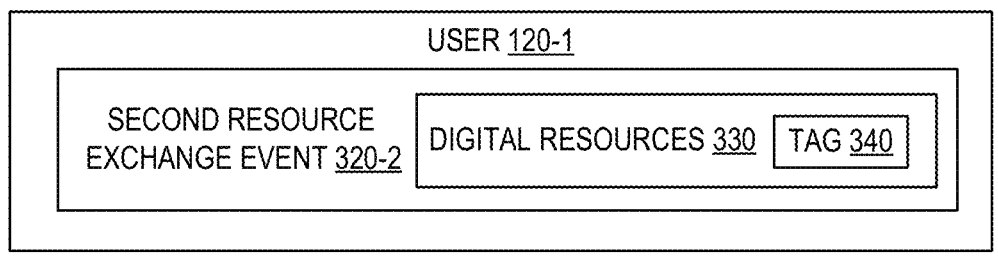
Figure 8:
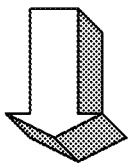
Figure 8:
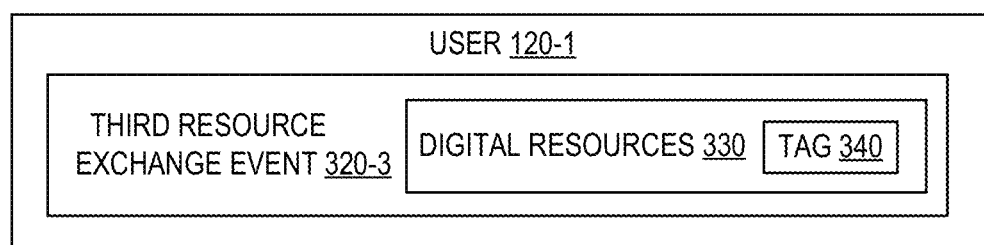

FIG. 8 highlights a resource exchange event movement pattern example in which the resource exchange events are conducted by the same user, in accordance with embodiments of the present invention. The same users constitute other pattern-defining criteria besides movement. As shown in FIG. 8, a first resource exchange event 320-1 is conducted by a first user 120-1 (or group of users) using digital resources 330 that are tagged with tag 340 which identifies, at a minimum, the location 341 (shown in FIG. 1) of the first resource exchange event 320-1. Second resource exchange event 320-2 conducted by the first user 120-1 (or group of users) using the same digital resources 330. Processing of second resource exchange event 320-2 includes tagging the digital resources 330 with tag 340 (i.e., additional information added to the existing tag or generating a new tag) which identifies, at a minimum, the location 341 (shown in FIG. 1) of the second resource exchange event 320-2. Third resource exchange event 320-3 is conducted by the first user 120-3 (or group of users) using the same digital resources 330. Processing of third resource exchange event 320-3 includes tagging the digital resources 330 with tag 340 (i.e., additional information added to the existing tag or generating a new tag) which identifies, at a minimum, the location 341 (shown in FIG. 1) of the third resource exchange event 320-3. The resource exchange event movement pattern 430 is identified by the machine-learning algorithms 410 when additional digital resources 330 undergo the same movement pattern and the same users (i.e., same users or group of users conducting the same sequence of resource exchange events). While three resource exchange events are shown, one of ordinary skill in the art will be appreciate that a pattern 430 may comprise more or less resource exchange events.

Referring to FIG. 9, a block diagram is presented of second computing platform 300, in accordance with embodiments of the present invention. In addition to providing greater details of resource exchange event application 310, FIG. 9 highlights various alternate embodiments of the invention. Second computing platform 300 may comprise one or multiple devices, such as servers or the like. Second computing platform 300 includes second memory 302, which may comprise volatile and/or non-volatile memory, such as read-only and/or random-access memory (RAM and ROM), EPROM, EEPROM, flash cards, or any memory common to computing platforms). Moreover, second memory 302 may comprise cloud storage, such as provided by a cloud storage service and/or a cloud connection service.

Further, second computing platform 300 includes one or more second computing processing devices 304, which may be an application-specific integrated circuit ("ASIC"), or other chipset, logic circuit, or other data processing device. Second computing processing device(s) 304 may execute one or more application programming interface (APIs) 306 that interface with any resident programs, such as resource exchange event application 310 or the like, stored in second memory 302 of second computing platform 300 and any external programs. Second computing processing devices(s) 304 may include various processing subsystems (not shown in FIG. 9) embodied in hardware, firmware, software, and combinations thereof, that enable the functionality of second computing platform 300 and the operability of second computing platform 300 on a distributed communication network 110 (shown in FIG. 1), such as the Internet, intranet(s), cellular network(s) and the like. For example, processing subsystems allow for initiating and maintaining communications and exchanging data with other networked devices. For the disclosed aspects, processing subsystems of second computing platform 300 may include any subsystem used in conjunction with resource exchange event application 310 and related tools, routines, sub-routines, algorithms, sub-algorithms, sub-modules thereof.

In specific embodiments of the present invention, second computing platform 300 additionally includes a communications module (not shown in FIG. 9) embodied in hardware, firmware, software, and combinations thereof, that enables electronic communications between components of second computing platform 300 and other networks and network devices. Thus, communication module may include the requisite hardware, firmware, software and/or combinations thereof for establishing and maintaining a network communication connection with one or more devices and/or networks.

Second memory 302 of second computing platform 300 stores resource exchange event application 310, which is executable by at least one of the one or more second computing processor devices 304. As previously discussed in relation to FIG. 1, resource exchange event application 310 is configured to process resource exchange events 320 that are conducted within a sub-environment 230 of the virtual reality computing environment 220 between the user 120 and a corresponding entity 240 (i.e., the entity 240 represented by the sub-environment 230). Processing of the resource exchange event 320 includes receiving digital resources 330 from the user 120 and tagging the digital resources 330 with a tag 340 that identifies, at least, a location 341 of the resource exchange event. The location 341 may include a sub-environment identifier 342 that identifies the virtual boundaries of the sub-environment and/or a virtual computing environment 343 identifier that identifies the specific virtual computing environment 220 in which the resource exchange event 320 occurs. In additional embodiments of the invention, tag 340 may include other resource exchange-related data, such as, but not limited to, a digital resource identifier 344, a user identifier 345, a resource exchange event identifier (including amount of resources, date/time and the like) and an entity identifier 348. Moreover, it should be noted that when subsequent resource exchange events use the digital resources 330, the corresponding tag 340 may be updated to include the location of the subsequent resource exchange event and any other resource exchange-related data or a new tag may be generated and attached to the digital resources with the location of the subsequent resource exchange event and any other resource exchange-related data.

Referring to FIG. 10, a block diagram is presented of third computing platform 400, in accordance with embodiments of the present invention. In addition to providing greater details of machine-learning-based algorithms 410, FIG. 10 highlights various alternate embodiments of the invention. Third computing platform 400 may comprise one or multiple devices, such as servers or the like. Third computing platform 400 includes third memory 402, which may comprise volatile and/or non-volatile memory, such as read-only and/or random-access memory (RAM and ROM), EPROM, EEPROM, flash cards, or any memory common to computing platforms). Moreover, third memory 402 may comprise cloud storage, such as provided by a cloud storage service and/or a cloud connection service.

Further, third computing platform 400 includes one or more third computing processing devices 404, which may be an application-specific integrated circuit ("ASIC"), or other chipset, logic circuit, or other data processing device. Third computing processing device(s) 404 may execute one or more application programming interface (APIs) 406 that interface with any resident programs, such as machine-learning based algorithm(s) 410 or the like, stored in third memory 402 of third computing platform 400 and any external programs. Third computing processing devices(s) 404 may include various processing subsystems (not shown in FIG. 10) embodied in hardware, firmware, software, and combinations thereof, that enable the functionality of third computing platform 400 and the operability of third computing platform 400 on a distributed communication network 110 (shown in FIG. 1), such as the Internet, intranet(s), cellular network(s) and the like. For example, processing subsystems allow for initiating and maintaining communications and exchanging data with other networked devices. For the disclosed aspects, processing subsystems of third computing platform 400 may include any subsystem used in conjunction with machine-learning based algorithm(s) 410 and related tools, routines, sub-routines, algorithms, sub-algorithms, sub-modules thereof.

In specific embodiments of the present invention, third computing platform 400 additionally includes a communications module (not shown in FIG. 10) embodied in hardware, firmware, software, and combinations thereof, that enables electronic communications between components of third computing platform 400 and other networks and network devices. Thus, communication module may include the requisite hardware, firmware, software and/or combinations thereof for establishing and maintaining a network communication connection with one or more devices and/or networks.

Third memory 402 of third computing platform 400 stores machine-learning-based algorithms (e.g., trained models or the like) 410, which is executable by at least one of the one or more third computing processor devices 404. As previously discussed in relation to FIG. 1, machine-learning-based algorithms are configured to receive and analyze 420 the tags 340 to determine one or more resource exchange event movement patterns 430 for digital resources 330. In this regard, resource exchange event movement patterns 430 define patterns of movement for specific digital resources 330. The resource exchange event movement patterns 430 may include one or more of (i) movement (i.e., resource exchange events occurring) across multiple virtual reality computing environments 432, (ii) movement of resources into or out of (i.e., resource exchange events occurring within) a non-virtual reality computing environment 434 (e.g., conventional Internet computing environment or the like) and/or (iii) movement (i.e., resource exchange events occurring) prior to tagging 436 of the digital resources within a virtual reality computing environment. Moreover, in addition to being specific to digital resources 330, the resource exchange event movement pattern 430 may be user specific 440. User group-specific (i.e., two or more affiliated users) 442, entity-specific 444 and/or sub-environment-specific (i.e., location specific) 446.

In additional embodiments of the invention, machine-learning-based algorithms (e.g., trained models or the like) 410 may further be configured to identify connected parties 452 (e.g., users or groups of users) to a resource exchange event pattern 430. In other additional embodiments of the invention, machine-learning-based algorithms (e.g., trained models or the like) 410 may further be configured to identify suspicious activity 460 and/or predict suspicious activity 460 based on resource exchange event patterns 430. In such embodiments of the invention, an ancillary application may be configured to generate a signal/alert to the resource exchange event application 310 to that notifies/alert the application 310 of suspicious activity 460 or the possibility of suspicious activity 460 or, in certain embodiments prevents resource exchange events from occurring if the include the digital resources 330 in the pattern(s) 430 or involve users 120 associated with the pattern(s) 430.

Referring to FIG. 11, a schematic diagram is presented that highlights a means for multi-entity accessing of tags, in accordance with embodiments of the present invention. Multiple distributed trust computing networks 600-1, 600-2, 600-3 and 600-4 (i.e., block chain networks) are shown. Each distributed trust computing networks 600-1, 600-2, 600-3 and 600-4 comprises a plurality of decentralized nodes 602-1, 602-2, 602-3 and 602-4. The decentralized nodes 602-1, 602-2, 602-3 and 602-4 include memory that stores one or more decentralized ledgers 604-1, 604-2, 604-3 and 604-4 that comprise data blocks. The data stored in the data blocks having been verified as authenticate via consensus by the decentralized nodes 602-1, 602-2, 602-3 and 602-4. According to embodiments of the present invention the data blocks of decentralized ledgers 604-1, 604-2, 604-3 and 604-4 store the digital resources 330-1, 330-2, 330-3 and 330-4 used to conduct the aforementioned resource exchange events, as well as the corresponding tags 340-1, 340-2, 340-3 and 340-4. In specific embodiments of the invention, each distributed trust computing networks 600-1, 600-2, 600-3 and 600-4 is associated with an entity 240 (e.g., financial institution, retailer or the like), such that each corresponding distributed ledger 604-1, 604-2, 604-3 and 604-4 store the digital resources 330-1, 330-2, 330-3 and 330-4 and associated tags 340-1, 340-2, 340-3 and 340-4 resulting from resource exchange events in which the entity 240 is a party to. In such embodiments of the invention, the various entities 240 (e.g., financial institution, retailer or the like) may form a network 700 that allows each of the entities 240 to access the multiple distributed trust computing networks 600-1, 600-2, 600-3 and 600-4 for purposes of retrieving and analyzing tags 340-1, 340-2, 340-3, 340-4 for purposes of determining resource exchange event movement patterns 430 (shown in FIGS. 1-8 and 10). In this regard, entities 240 in the network 700 are capable of accessing/analyzing tags associated with digital resources 330 no longer in their possession (i.e., no longer stored on their specific distributed trust computing network) and/or associated with resource exchange events 320 which they were not a party to.

Referring to FIG. 12, a flow diagram is presented of a method 800 for tracking digital resources used in digital resource exchange events conducted within virtual reality computing environments, in accordance with embodiments of the present invention. At Event 910, a virtual reality computing environment (which may include the Metaverse or a portion thereof or an augmented reality computing environment) is presented to a user. The virtual reality computing environment includes a plurality of sub-environments, also referred to as zones, regions, sub-verses or bounded locations that represent a non-human entity, such as an organization, an agency, a business or the like. The sub-environments are configured with means for conducting resource exchange events between the user and the entity.

At Event 820, a resource exchange event conducted with one of the sub-environments and between the user and the corresponding entity is processed. Processing of the resource exchange event includes, at Sub-Event 822, receiving digital resources from the user and, at Sub-Event 824, the digital resources are tagged with a tag that identifies the virtual location of the resource exchange event (e.g., the virtual reality computing environment and/or the sub-environment). In additional embodiments the tag may include other resource exchange event-related data such data that identifies the user, the entity, the resource exchange event, the date/time and the like.

At Event 830, machine-learning-based algorithms/trained models are implemented to analyze tags to determine/identify resource exchange event movement patterns (i.e., patterns of where the digital resource exchange events occur within multiple different virtual and non-virtual computing environments). In specific embodiments of the method, resource exchange event movement patterns are used to identify parties connected to the patterns and or determine or predict suspicious activity. In response to determining or predicting, suspicious activity, the method may include, notifying event processing mechanisms, such that additional security measures can be implemented to prevent malicious activity including preventing use of the digital resources in further resource exchange events or prohibiting users associated with the patterns from conducting further resource exchange events.

Thus, present embodiments of the invention discussed in detail above, provide for tracking digital resources used in resource exchange events conducted in virtual reality computing environments. Digital resources used in resource exchange events conducted in virtual reality computing environments are tagged with data that identifies the digital resources, resource exchange event, the parties involved in the resource exchange event and the virtual computing environment in which the resource exchange event takes place. In response, machine-learning algorithm(s) are implemented that analyze the tags to determine resource exchange event movement patterns for specific digital resources. The resource exchange event movement patterns may include digital resource movement across multiple different virtual computing environments. Resource exchange event movement patterns may be used to identify connected parties and/or suspicious activities, such that, subsequent resource exchange events involving the same users, connected parties and digital resources can be prevented or heightened security measures can be implemented to authorize such resource exchange events.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for tracking digital resources across multiple virtual reality computing environments, the system comprising:
   a first computing platform including a first memory and one or more first computing processor devices in communication with the first memory, wherein the first memory stores a virtual reality application executable by at least one of the one or more first computing processor devices and configured to:
      present, to users, a virtual reality computing environment that includes sub-environments, each of the sub-environments representing a corresponding entity;
   a second computing platform including a second memory and one or more second computing processor devices in communication with the second memory, wherein the second memory stores a resource exchange event application executable by at least one of the one or more second computing processor devices and configured to:

process resource exchange events, each resource exchange event conducted (i) within one of the sub-environments, and (ii) between one of the users and the corresponding entity, wherein processing includes receiving digital resources from the user and tagging the digital resources with a tag that identifies at least a location of the resource exchange event; and a third computing platform including a third memory and one or more third computing processor devices in communication with the third memory, wherein the third memory stores one or more machine-learning based algorithms executable by at least one of the one or more third computing devices and configured to:

receive and analyze the tags to determine one or more resource exchange event movement patterns for digital resources.

2. The system of claim 1, wherein the one or more machine-learning based algorithms are further configured to analyze the tags to determine the one or more resource exchange event movement patterns for the digital resources, wherein the one or more resource exchange event movement patterns include a resource exchange event movement pattern that provides for movement of digital resources across two or more virtual reality computing environments.

3. The system of claim 1, wherein the one or more machine-learning based algorithms are further configured to analyze the tags to determine the one or more resource exchange event movement patterns for the digital resources, wherein the one or more resource exchange event movement patterns include a resource exchange event movement pattern that provides for movement of digital resources into or out of a non-virtual computing environment.

4. The system of claim 1, wherein the one or more machine-learning based algorithms are further configured to analyze the tags to determine the one or more resource exchange event movement patterns for the digital resources, wherein the one or more resource exchange event movement patterns include a resource exchange event movement pattern that provides for movement of the digital resources prior to the tagging of the digital resources.

5. The system of claim 1, wherein the one or more machine-learning based algorithms are further configured to analyze the tags to determine the one or more resource exchange event movement patterns for the digital resources, wherein the one or more resource exchange movement patterns include resource exchange event movement patterns that are specific to at least one of (i) one of the users, (ii) a group of the users, and (iii) an entity represented by a sub-environment.

6. The system of claim 1, wherein the one or more machine-learning based algorithms are further configured to identify users or groups of users connected to the one or more resource exchange event movement patterns.

7. The system of claim 1, wherein the one or more machine-learning based algorithms are further configured to identify suspicious activity based on the one or more resource exchange event movement patterns and, in response to identifying suspicious activity, generate and communicate signals to the resource exchange event application that are configured to prevent at least one of (i) one of the users from conducting a subsequent resource exchange event, and (ii) specified digital resources being used to conduct a subsequent resource exchange event.

8. The system of claim 1, further comprising a plurality of distributed trust computing networks, each distributed trust computing network (i) associated with one or more of the entities represented by the sub-environments and (ii) comprising a plurality of decentralized nodes, each decentralized node having a fourth memory and one or more fourth computing processor devices in communication with the fourth memory, wherein the fourth memory of the decentralized nodes is configured to store at least one distributed ledger comprising a plurality of data blocks, wherein the plurality of data blocks store resource exchange event data including the tags.

9. The system of claim 8, wherein a plurality of the entities represented by the sub-environments have access to the plurality distributed trust computing networks for purposes of accessing the tags and analyzing the tags with the one or more machine-learning based algorithms.

10. A computer-implemented method for tracking digital resources within multiple virtual reality computing environments, the method being executable by one or more computing device processors and comprising:

presenting, to users, a virtual reality computing environment from amongst two or more virtual reality computing environments, wherein the virtual reality computing environment includes sub-environments, each of the sub-environments representing a corresponding entity;

processing resource exchange events, each resource exchange event conducted (i) within one of the sub-environments and (ii) between one of the users and the corresponding entity, wherein processing comprises:
receiving digital resources from the user, and
tagging the digital resources with a tag that identifies at least a location of the resource exchange event; and implementing one or more machine-learning algorithms to analyze the tags to determine one or more resource exchange event movement patterns for digital resources.

11. The computer-implemented method of claim 10, wherein implementing further comprises:

implementing the one or more machine-learning algorithms to analyze the tags to determine the one or more resource exchange event movement patterns for digital resources, wherein the one or more resource exchange event movement patterns include a resource exchange event movement pattern that provides for movement of digital resources across the two or more virtual reality computing environments.

12. The computer-implemented method of claim 10, wherein implementing further comprises:

implementing the one or more machine-learning algorithms to analyze the tags to determine the one or more resource exchange event movement patterns for digital resources, wherein the one or more resource exchange event movement patterns include a resource exchange event movement pattern that provides for movement of digital resources into or out of a non-virtual computing environment.

13. The computer-implemented method of claim 10, wherein implementing further comprises:

implementing the one or more machine-learning algorithms to analyze the tags to determine the one or more resource exchange event movement patterns for digital resources, wherein the one or more resource exchange event movement patterns include a resource exchange event movement pattern that provides for movement of the digital resources prior to the tagging of the digital resources.

14. The computer-implemented method of claim 11, wherein implementing further comprises:

implementing the one or more machine-learning algorithms to analyze the tags to determine the one or more resource exchange event movement patterns for digital resources, wherein the one or more resource exchange event movement patterns include resource exchange event movement patterns that are specific to at least one of (i) one of the users, (ii) a group of the users, and (iii) an entity represented by a sub-environment.

15. The computer-implemented method of claim 11, further comprising:
implementing one or more machine-learning algorithms to identify users or groups of users connected to the one or more resource exchange event movement patterns.

16. The computer-implemented method of claim 11, further comprising:
implementing machine-learning algorithms to identify suspicious activity based on the one or more resource exchange event movement patterns; and
in response to identifying suspicious activity, generating and communicating signals that are configured to prevent at least one of (i) one of the users from conducting a subsequent resource exchange event, and (ii) specified digital resources being used to conduct a subsequent resource exchange event.

17. A computer program product comprising:
a non-transitory computer-readable medium comprising sets of codes for causing one or more computing devices to:
present, to users, a virtual reality computing environment from amongst two or more virtual reality computing environments, wherein the virtual reality computing environment includes sub-environments, each of the sub-environments representing a corresponding entity;
process resource exchange events, each resource exchange event conducted (i) within one of the sub-environments and (ii) between one of the users and the corresponding entity, wherein processing comprises:
receiving digital resources from the user, and
tagging the digital resources with a tag that identifies at least a location of the resource exchange event; and
implement machine-learning techniques to analyze the tags to determine one or more resource exchange event movement patterns for digital resources.

18. The computer program product of claim 17, wherein the set of codes for causing the one or more computing devices to implement machine-learning are further configured to cause the one or more computing devices to implement machine-learning techniques to analyze the tags to determine the one or more resource exchange event movement patterns for digital resources, wherein the one or more resource exchange event movement patterns include a resource exchange event movement pattern that provides for movement of digital resources across the two or more virtual reality computing environments.

19. The computer program product of claim 17, wherein the set of codes for causing the one or more computing devices to implement machine-learning are further configured to cause the one or more computing devices to implement machine-learning techniques to analyze the tags to determine the one or more resource exchange event movement patterns for digital resources, wherein the one or more resource exchange event movement patterns include a resource exchange event movement pattern that provides for movement of digital resources into or out of a non-virtual computing environment.

20. The computer program product of claim 17, wherein the sets of codes further comprises sets of codes for causing the one or more computing devices to:
implement machine-learning to identify suspicious activity based on the one or more resource exchange event movement patterns; and
in response to identifying suspicious activity, generate and communicate signals that are configured to prevent at least one of (i) one of the users from conducting a subsequent resource exchange event, and (ii) specified digital resources being used to conduct a subsequent resource exchange event.

* * * * *